United States Patent
Lee

(10) Patent No.: US 11,652,434 B2
(45) Date of Patent: May 16, 2023

(54) NOISE REMOVER OF PWM MOTOR WITHOUT FREQUENCY CONTROL FILTER

(71) Applicant: Robert Bosch GmbH, Stuttgart (DE)

(72) Inventor: Hoon Lee, Sejong (KR)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 17/381,495

(22) Filed: Jul. 21, 2021

(65) Prior Publication Data

US 2022/0029574 A1  Jan. 27, 2022

(30) Foreign Application Priority Data

Jul. 23, 2020 (KR) .......................... 10-2020-0091386

(51) Int. Cl.
 *H02P 27/08* (2006.01)
 *H02M 7/5395* (2006.01)
 *H02P 23/04* (2006.01)

(52) U.S. Cl.
 CPC ........ *H02P 27/085* (2013.01); *H02M 7/5395* (2013.01); *H02P 23/04* (2013.01)

(58) Field of Classification Search
 CPC ...... H02P 23/04; H02P 27/085; H02M 7/5395
 See application file for complete search history.

(56) References Cited

U.S. PATENT DOCUMENTS

| | | | | |
|---|---|---|---|---|
| 6,456,946 B1* | 9/2002 | O'Gorman | ........... | B62D 5/0487 |
| | | | | 702/58 |
| 6,788,923 B2* | 9/2004 | Tsujishita | ............... | H03G 3/345 |
| | | | | 455/296 |
| 7,457,604 B2* | 11/2008 | Patel | ...................... | H04B 15/02 |
| | | | | 455/343.1 |
| 2005/0064842 A1* | 3/2005 | Patel | ...................... | H04B 15/02 |
| | | | | 455/345 |
| 2006/0097685 A1* | 5/2006 | Shin | ........................ | H03K 7/08 |
| | | | | 318/696 |

(Continued)

FOREIGN PATENT DOCUMENTS

KR    101337695 B1    12/2013

OTHER PUBLICATIONS

Definitions, "What does MICOM mean?", <https://www.definitions.net/definition/MICOM>, accessed Jul. 21, 2022 (4 pages).

(Continued)

*Primary Examiner* — Rina I Duda
(74) *Attorney, Agent, or Firm* — Michael Best & Friedrich LLP

(57) ABSTRACT

Provided is a noise remover of a PWM motor without a frequency control filter in a PWM control motor, and more particularly, includes a micom formed in the vehicle terminal and converting to and transmitting the frequency avoiding the radio frequency; a frequency filter for suppressing the noise converted by the micom; a motor part for transmitting the frequency that the frequency filter outputs to a vehicle motor, and operating the motor; and a pulse modulation/demodulation control part for controlling the rotation amount of the vehicle motor inside the motor part, which are divided roughly as four, and rotate a rotor of the motor part without noise by selectively applying the frequency which is not overlapped with radio frequency to a first FET, a second FET, a third FET, and a fourth FET.

5 Claims, 3 Drawing Sheets

(56) References Cited

U.S. PATENT DOCUMENTS

| | | | |
|---|---|---|---|
| 2011/0064237 A1* | 3/2011 | Hermann | G11B 33/1493 |
| | | | 381/71.4 |
| 2014/0119565 A1* | 5/2014 | Kim | G10K 15/02 |
| | | | 381/86 |
| 2017/0110992 A1* | 4/2017 | Han | H02P 21/13 |
| 2018/0259560 A1* | 9/2018 | Miyaji | H02P 29/50 |

OTHER PUBLICATIONS

DroneBot Workshop, "Control Large DC Gearmotors with PWM & Arduino", <https://dronebotworkshop.com/dc-gearmotors-pwm/>, accessed Jul. 21, 2022 (44 pages).

Federal Communications Commission,"FM Radio," definition available at <https://www.fcc.gov/general/fmradio#:~:text=FM%20is%20short%20for%20frequency,many%20classes%20of%20radio%20stations> web page visited Nov. 4, 2022 (1 page).

* cited by examiner

< LIN Communication >

< CAN Communication >

NOISE REMOVER OF PWM MOTOR WITHOUT FREQUENCY CONTROL FILTER

BACKGROUND OF THE INVENTION

Embodiments of the present invention relate to a noise remover of a PWM motor without a frequency control filter, and more particularly, to a noise remover of a PWM motor without a frequency control filter, which includes a micom transmitting frequency after converting to the frequency avoiding radio frequency in a mobile terminal; a frequency filter for converting the noise converted by the micom; a motor part for seconding the frequency output by the frequency filter to a mobile vehicle motor to operate the motor; and a pulse width modulation (PWM) control part for controlling the rotation amount of the vehicle motor inside the motor part, which are divided as four, in order to rotate a rotor of the motor part without noise by selectively applying the frequency which is not overlapped with radio frequency to a first FET, a second FET, a third FET, and a fourth FET in the motor part.

Many studies and researches have been conducted for digitalization of vehicle components for the power source of a vehicle in the automobile industry. By digitalizing existing internal combustion engines in normal mobile cars and improving their fuel efficiency greatly, many studies and researches have been conducted based on eco-friendly vehicles, and developments have been made in preciseness increase, torque converter removal for increasing the transmission efficiency of engines, high miniature of vehicle motors for engine optimized point operation, and so on.

Therefore, the noise removal filter which is not overlapped with radio frequency has been researched and developed in order to increase the preciseness of vehicle motors, and the radio frequency for the noise removal filter is short in wavelength, and made to be easily radiated to the air.

Since the radiated noise is radiated to the air as electric pulses, it is much mixed as noises with frequency modulation (FM) receivers of vehicle motors or radios, the noise can be divided into normal mode noise and common mode noise. The normal mode noise is the noise component shown in the electric wire lines of electric current, and it is ripple voltage coming with overlapped with output voltage, and the common mode noise is the spike noise which means the component shown between each electric wire line and grounding conductor, which is difficult to be prevented.

The common mode noise is generated due to unbalance of electric current about the electric lines therein, and since the lengths of the electric wire lines forming both electrodes are different and the components connected to the electric wire lines are different, electric current cannot flow for both electrodes to correspond with. This phenomenon is called unbalance state.

Further, as one embodiment for improving normal mode noise or common mode noise, noise removers for PWM motor without frequency control filter have been invented as experiment results for noise rectification by a frequency filter.

As related art of technology, there is Korean Patent Registration No. 10-1337695 entitled as MICROPHONE ARRAY SUBSET SELECTION FOR ROBUST NOISE REDUCTION.

However, the related art of technology has problems in that the radio frequency formed as designated frequency is easily overlapped with those of other communication equipments, and only skilled technicians in engineering can easily use, and so on.

SUMMARY OF THE INVENTION

Embodiments of the present invention provide communication environment that the component coupled with a frequency filter does not overlap with radio noise.

Embodiments of the present invention provide a micom (multifunctional instrument cluster operation module) in which various communication cards including LIN (LOCAL INTERCONNECT NETWORK) communication, CAN (CONTROLLER AREA NETWORK) communication, and ISO Serial communication can be used with high reliability and easy infrastructure.

Embodiments of the present invention provides a micom in which various communication cards including LIN (LOCAL INTERCONNECT NETWORK) communication, CAN(CONTROLLER AREA NETWORK) communication, and ISO Serial communication can be used with high compatibility and optimal communication environment which frequency is not overlapped with.

Embodiments of the present invention provides a motor for a mobile vehicle with a high durability in which a rotor of the vehicle motor in a frequency filter is made of magnet, and the rotor is prevented from broken when the rotor exceeds excessive voltage threshold.

Embodiments of the present invention provides a vehicle motor, in which a stator of the vehicle motor in a frequency filter for removing noise of a PWM control motor is composed of a first FET, a second FET, a third PET, and a fourth PET, so as to remove a motor noise.

In accordance with an aspect of the present invention, a noise remover of a PWM motor without frequency control filter for mobile vehicle may include a radio for outputting fixed radio frequency information; a micom for receiving the fixed radio frequency information of the radio and outputting a motor frequency avoiding the radio frequency; a motor part for receiving avoided motor frequency based on the radio frequency by the micom; and a pulse modulation/demodulation control part for modulating/demodulating the motor frequency inside the micom.

Further, the micom may include a storage part for storing the radio frequency and the motor frequency inside the micom; and a communication part for receiving the motor frequency, which the radio outputs to the micom and stores in the storage part, by using a communication card therein.

Further, the micom can be controlled to the frequency band of the motor which is not overlapped with the radio frequency, and removes the motor noise.

Further, the noise remover may include the radio for outputting fixed radio frequency information; the micom for receiving the fixed frequency output by the radio; the communication part for receiving the motor frequency, which the micom stores in the storage part, with a communication card therein; and the motor part for receiving the motor frequency based on the fixed radio frequency by the communication part in the micom, and the motor part is made to have a first PET, a second PET, a third PET, and a fourth PET, which are respectively divided.

Further, the micom receives the motor frequency which the radio outputs, and the micom connects power from the first PET to the fourth FET to forward-rotate the motor, or connects power from the second FET to the third FET to counter-rotate the motor.

Further, the pulse width of the pulse modulation/demodulation control part can be controlled by the micom, so as to control the rotation amount of the motor.

Further, the micom can control the motor frequency avoiding the radio frequency based on the fixed radio frequency of a vehicle which the radio outputs, so as to remove the motor noise.

Further, the vehicle motor may be selected from a window lift, motor, a seat control motor, or a sun roof motor.

Further, the motor frequency can be controlled by the pulse modulation/demodulation control part of the micom.

Therefore, according to the noise remover of a PWM motor without frequency control filter of the present invention, the communication environment is provided, in which the component coupled with a frequency filter is not overlapped with radio noise.

Therefore, according to the noise remover of a PWM motor without a frequency control filter of the present invention, various communication cards including LIN (LOCAL INTERCONNECT NETWORK) communication, CAN(CONTROLLER AREA NETWORK) communication, and ISO Serial communication can be used in the micom with high reliability and easy infrastructure.

Therefore, according to the noise remover of a PWM motor without a frequency control filter of the present invention, optimal communication environment is provided in which various communication cards including LIN (LOCAL INTERCONNECT NETWORK) communication, CAN(CONTROLLER AREA NETWORK) communication, and ISO Serial communication can be used in the micom with high compatibility so that frequency is not overlapped.

Therefore, according to the noise remover of a PWM motor without a frequency control filter of the present invention, a vehicle motor can be provided with a high durability, in which a rotor of the vehicle motor in a frequency filter is made of magnet, and the rotor can be prevented from broken when the rotor exceeds excessive voltage threshold.

Therefore, according to the noise remover of a PWM motor without a frequency control filter of the present invention, the stator of the vehicle motor is made to include a first FET, a second FET, a third FET, and a fourth FET, so that motor noise can be removed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The foregoing and other features and advantages of the present inventions will be apparent from the more particular description of preferred embodiments of the present inventions, as illustrated in the accompanying drawings in which like reference characters refer to the same parts throughout the different views. The drawings are not necessarily to scale, emphasis instead being placed upon illustrating the principles of the present inventions. In the drawings.

DETAILED DESCRIPTION

Figure 1:
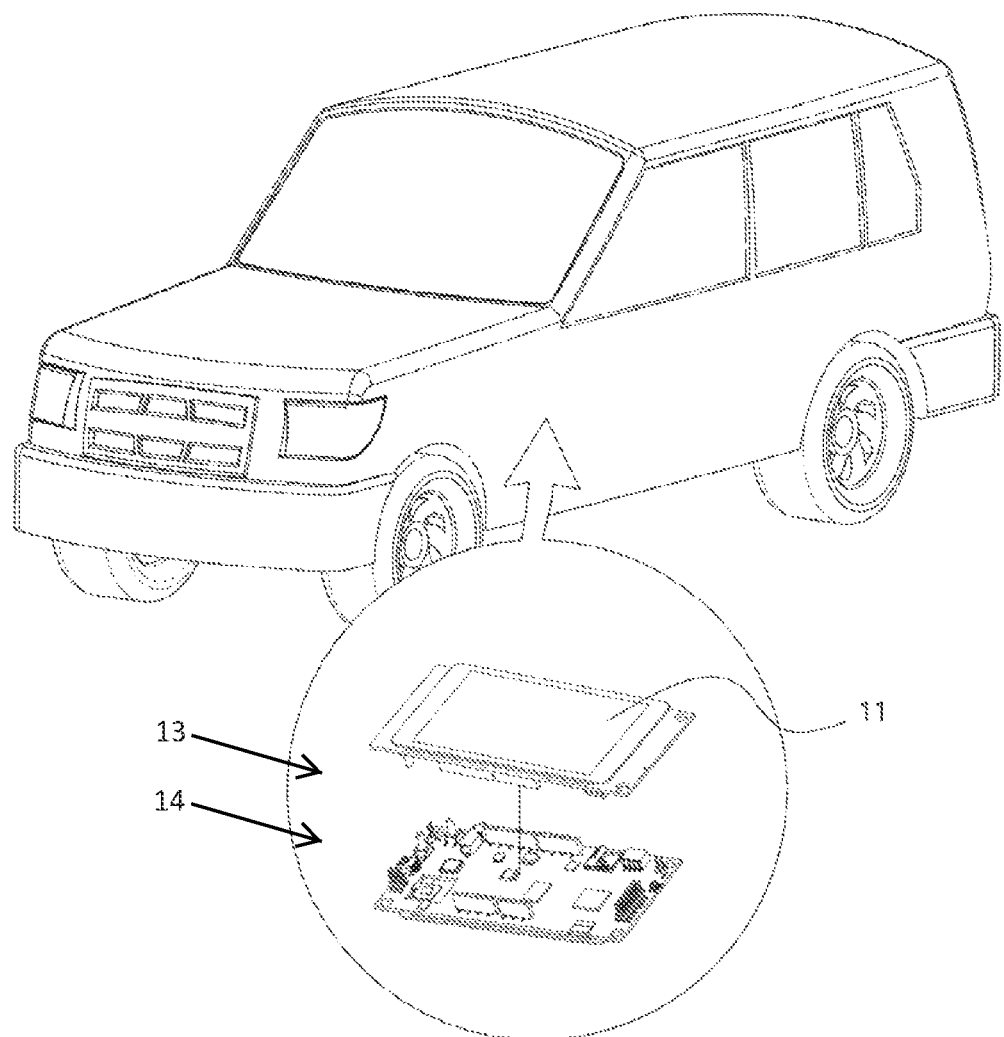
FIG. 1 is a perspective view of a frequency filter for removing noise of a pulse modulation/demodulation control motor according to the present invention.

Since exemplary embodiments of the present invention are provided only for structural and functional descriptions of the present invention, the present invention should not be construed as limited to the embodiments set forth herein. Thus, it will be clearly understood by those skilled in the art that the exemplary embodiments of the present invention may be embodied in different forms and include equivalents that can realize the spirit of the present invention. It should be understood, however, that it is not intended to limit the present invention to the particular forms disclosed, but on the contrary, the present invention is to cover all modifications, equivalents, and alternatives falling within the spirit and scope of the present invention as defined by the appended claims.

It will be understood that, although the terms first, second, etc. may be used herein to describe various elements, components and/or sections, these elements, components, and/or sections should not be limited by these terms. These terms are only used to distinguish one element, component or section from another ones. Thus, a first element, component or part discussed below could be termed a second element, component or part without departing from the teachings of the present invention.

It will be understood that when an element or part is referred to as being "connected to" or "coupled to" another element or part, it can be directly connected or coupled to the other element or part or intervening elements or parts may be present. In contrast, when an element is referred to as being "directly connected to" or "directly coupled to" another element or part, there are no intervening elements or parts present. Meanwhile, spatially relative terms, such as "between" and "directly between" or "adjacent to" and "directly adjacent to" and the like, which are used herein for ease of description to describe one element or feature's relationship to another element(s) or feature(s) as illustrated in the figures, should be interpreted similarly.

The terminology used herein is for the purpose of describing particular embodiments only and is not intended to be limiting of the present invention. As used herein, the singular forms "a" and "the" are intended to include the plural forms as well, unless the context clearly indicates otherwise. Terms indicating directions of apparatuses or elements (such as "front", "back", "up", "down" "top", "bottom" "left", "right", and "lateral") are used to simplify description of the invention and do not represent nor mean that the apparatuses or elements have specific directions. It will be further understood that the terms "comprises" and/or "comprising," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless expressly defined in a specific order herein, respective steps described in the present invention may be performed otherwise. That is, the respective steps may be performed in a specified order, substantially at the same time, or in reverse order.

The present invention will now be described more fully hereinafter with reference to the accompanying drawings, in which exemplary embodiments of the present invention are shown.

As shown in FIG. 1 of a perspective view of a frequency filter for removing noise of a pulse modulation/demodulation control motor according to embodiments of the present invention, a micom 11 in the terminal of a mobile vehicle transmits the frequency set by a user, and avoids to the frequency which is not overlapped with radio frequency, and a motor part 12 transmits the frequency output by the micom 11 to a vehicle motor, so as to control the rotation amount of the vehicle motor.

Further, the micom 11 outputs frequency, but outputs the frequency, which is not overlapped with radio frequency, and selectively applies to a first FET 15, a second FET 16, a third FET 17, or a fourth FET 18 of the motor part 12 so that a rotor of the motor part 12 can be rotated without noise.

Figure 2:
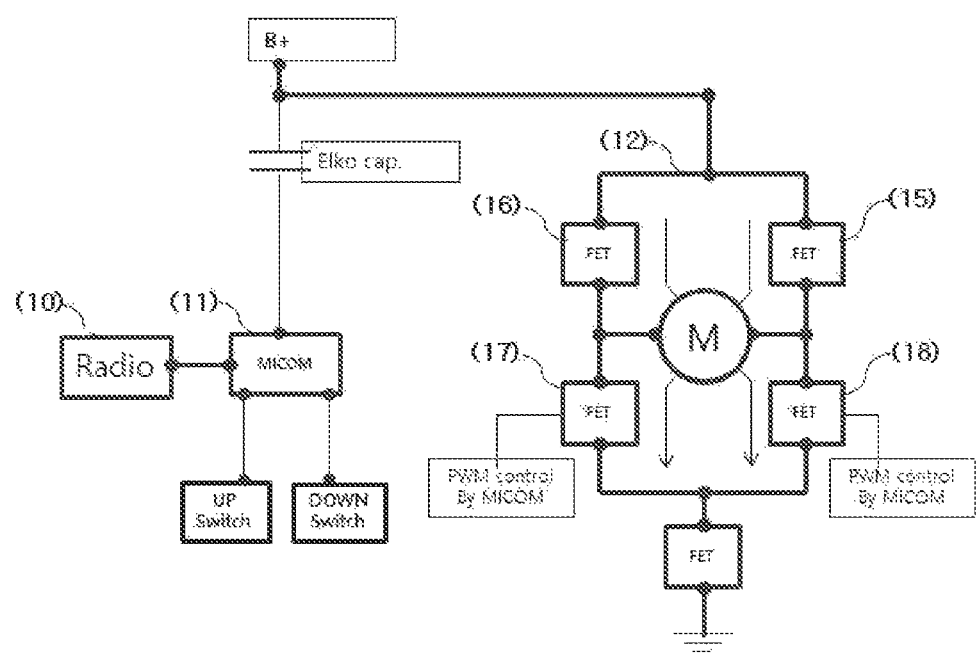
FIG. 2 is a circuit diagram of a frequency filter for removing noise of a pulse modulation/demodulation control motor according to the present invention.

As shown in FIG. 2 of a circuit diagram of a frequency filter for removing noise of a pulse modulation/demodulation control motor according to embodiments of the present invention, the micom. 11 in the terminal of a vehicle includes a communication part 14 for receiving the motor frequency, which the micom 11 stores in a storage part 13, by using a communication card therein, and the motor part 12 receives the motor frequency based on the radio frequency fixed by the communication part 14, and the motor part 12 is composed of the first PET 15, the second FET 16, the third FET 17, and the fourth FET 18 which are divided respectively.

Then, when the radio 10 located inside a vehicle and the vehicle motor operate simultaneously, the micom 11 detects each frequency thereof, and stores in the storage part 13.

Further, the radio frequencies stored in the storage part 13 is formed variously, depending on nations and areas, and transmitted to the air.

Further, the micom 11 operates to make the frequencies avoid so that the motor frequency stored in the storage part 13 is not overlapped with the radio frequency, and the presently-used radio frequency information is transmitted to and received by the motor part through communication lines by CAN(CONTROLLER AREA NETWORK) or LIN (LOCAL INTERCONNECT NETWORK) or ISO Serial communication card.

Figure 3:
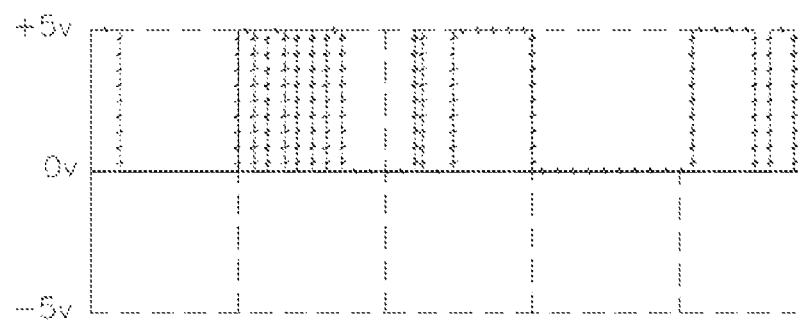
FIG. 3 is a view of one embodiment of the present invention showing a frequency, filter for removing noise of a pulse modulation/demodulation control motor according to the present invention.
Figure 3:
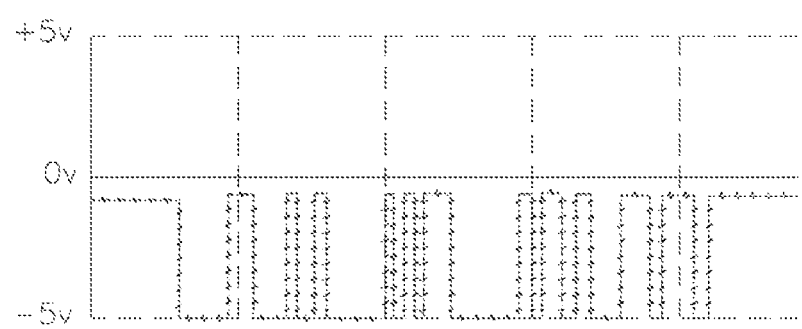

As shown in FIG. 3 of a communication card response characteristic view of the frequency filter for removing the noise of the pulse modulation/demodulation control motor according to embodiments of the present invention, CAN (CONTROLLER AREA NETWORK) and LIN (LOCAL INTERCONNECT NETWORK) communication card are used for communication devices for vehicles using practical communication cards, and the LIN communication card has advantages of high data transmission rate up to maximum 20 Kbps, high reliability, and easy compatibility, and since it has one transmission unit and a plurality of receiving units, the LIN communication card is characterized to be used for the control for electronic components for a vehicle such as doors, windows, lamps, switches, etc. for vehicles.

Further, the CAN communication card is characterized to have transmission rate up to maximum 1 Mbps, and include a plurality of transmission units, and therefore, the CAN communication card is used for the control of the main management components of a vehicle.

Further, since the LIN (LOCAL INTERCONNECT NETWORK) communication card and the CAN(CONTROLLER AREA NETWORK) communication card are characterized to have high compatibility between them, and they use different frequencies from each other, the frequencies are not overlapped, and the communication cards can be added and used additionally in various forms.

As the circuit diagram of the frequency filter for removing noise of the pulse modulation/demodulation control motor according to embodiments of the present invention of FIG. 2, the vehicle motor includes the first FET 15, the second PET 16, the third PET 1.7, and the fourth FET 18, which are respectively divided, and when electric current is applied to the motor part 12, the vehicle motor can be also operated by the operation way of the motor by the magnetic field of Fleming's left hand rule.

As the operating method of the motor part 12, it is conducted by a first reverse polarity break step (S10) in which the frequency rectified in the micom 11 is output to the first FET 15, and when the polarity is the reverse polarity, it can be conducted, a first rotation step (S20) in which the frequency of the first FET 15 is output to the second FET 16 so that the rotor is rotated right way to 180°, and a second rotation step (S30) in which the frequency of the second PET 16 is output to the third PET 17 so that the rotor is second rotated right way to 180°, which are sequentially and repeatedly operated, and therefore, the vehicle motor installed in the motor part 12 can be rotated.

Additionally, since the rotor of the motor part 12 installed in the frequency filter for removing noise of the pulse modulation/demodulation control motor was made of metal in conventional technology, it has limited average life time of about 20 to 30 years due to aging phenomenon of the metal body, and the life time is much varied differently by the applied pressure. Further, when electric current is applied to the metal body, the metal body is partially discharged about the crack formed in the metal body and eroded. When the dielectric strength of the metal body exceeds the threshold of rated voltage or transient voltage by the partial discharge, the function thereof is lost, and by using magnet instead of metal, the rotor can be prevented from being broken.

The foregoing is illustrative of embodiments and is not to be construed as limiting thereof. Although a few embodiments have been described, those skilled in the art will readily appreciate that many modifications are possible without materially departing from the novel teachings and advantages. Accordingly, all such modifications are intended to be included within the scope of this present invention as defined in the claims. In the claims, means-phis-function clauses are intended to cover the structures described herein as performing the recited function, and not only structural equivalents but also equivalent structures.

| <Description of Numerals> |
|---|
| 10: radio |
| 11: micom |
| 12: motor part |
| 13: storage part |
| 14: communication part |
| 15: first FET |
| 16: second FET |
| 17: third FET |
| 18: fourth FET |

The invention claimed is:

1. An apparatus for a motor vehicle, the apparatus comprising:

a rotation motor supplied with a pulse-width-modulated (PWM) voltage having a first frequency;

a frequency modulation (FM) receiver of a vehicle radio configured to receive radio transmissions at a selected frequency of a plurality of second frequencies; and a multifunctional instrument cluster operation module (MICOM) connected to the FM receiver of the vehicle radio to receive information identifying the selected frequency of the plurality of second frequencies and configured to control the first frequency to be in a frequency band not overlapped with the second frequencies to avoid an overlap between the first frequency and the selected frequency of the plurality of second frequencies and to remove motor noise;

wherein the MICOM comprises:

a storage part for storing values of the first frequency and the plurality of second frequencies variously depending on nations and areas; and a communication part for receiving from the FM receiver of the vehicle radio the information identifying the selected frequency of the plurality of second frequencies, the information including a value of the selected frequency.

2. The apparatus according to claim 1, further comprising an H-bridge configured to supply the PWM voltage to a first field effect transistor (FET), a second FET, a third FET, and a fourth FET in respective arms thereof.

3. The apparatus according to claim 2, wherein the MICOM is configured to:

apply the first frequency to the third FET and to the fourth FET; and connect power to the rotation motor through the first FET and the fourth FET to forward-rotate the rotation motor, or connect power to the rotation motor through the second FET and the third FET to counter-rotate the rotation motor.

4. The apparatus according to claim 2, wherein the MICOM is configured to control pulse width of the PWM voltage and rotation amount of the rotation motor.

5. The apparatus according to claim 1, wherein the rotation motor is a window lift motor, a seat control motor, or a sun roof motor of the motor vehicle.

* * * * *